March 5, 1968     R. E. ESCH     3,372,333
DIFFERENTIAL CAPACITOR TRANSDUCER APPARATUS HAVING COARSE AND
FINE ADJUSTMENTS AND MEANS FOR CHANGING SCALE SPAN
Filed Sept. 28, 1964     2 Sheets-Sheet 1

INVENTOR.
ROBERT E. ESCH

BY

HIS ATTORNEY

United States Patent Office 3,372,333
Patented Mar. 5, 1968

3,372,333
DIFFERENTIAL CAPACITOR TRANSDUCER APPARATUS HAVING COARSE AND FINE ADJUSTMENTS AND MEANS FOR CHANGING SCALE SPAN
Robert E. Esch, Kettering, Ohio, assignor to The Sheffield Corporation, Dayton, Ohio, a corporation of Delaware
Continuation-in-part of application Ser. No. 250,536, Jan. 10, 1963. This application Sept. 28, 1964, Ser. No. 399,548
1 Claim. (Cl. 324—98)

ABSTRACT OF THE DISCLOSURE

A position responsive measuring device having a differential capacitor transducer comprising a plurality of capacitive elements, means for shifting an electrical dividing line along the elements, and a pickoff capacitive member. Indicating apparatus provide indications of the displacement of the pickoff member from the electrical dividing line. A plurality of operational mode control systems and mode selection devices are operated in conjunction with the transducer.

---

Figure 1:
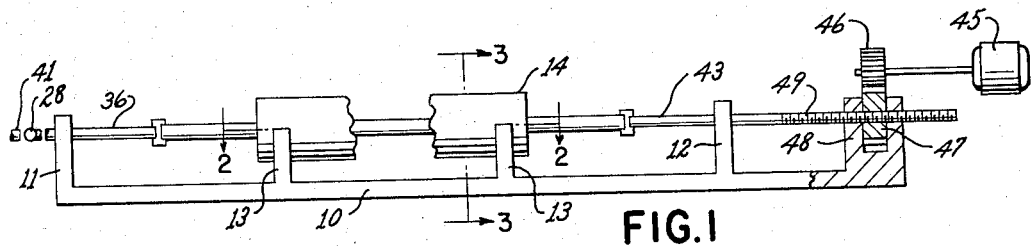

This invention relates to transducers and more specifically to electromechanical transducers converting mechanical displacements to electrical equivalents and vice versa.

This application is a continuation-in-part of application Ser. No. 250,536, filed Jan. 10, 1963.

One known type of transducer provides a differential capacitor wherein an electrode operates across a series of small elements with each of said elements at a different potential or voltage with respect to some initial reference and with respect to each other. In this arrangement the length of the electrode is considerably longer than the length of any of the multiple segments, and with each of said segments being at a different potential from all of the others and thus from an adjoining one, the movement of the electrode across such segments introduces numerous crossing errors and problems of discontinuity in the electrical signals. Even with time consuming and thorough corrective measures which include recalibration at different points along the length of the bar there is still discontinuity in the curve produced as the pickoff electrode moves with respect to the initial reference position such that the transducer does not give optimum performance. Furthermore such recalibration must be done at each element with the further problem that each such element may have a different calibration point.

In my co-pending application, S.N. 250,536, I disclosed a precision long range electrical transducer capable of very precise measurements over a range of many inches and embodying two similar elongated bars arranged end-to-end and relatively insulated, with a pickoff conductor of a length shorter than the effective length of either of the bars, so that the bars and conductor constitute a differential capacitor. While the invention of my copending application referred to above offers many advantages over prior known structure for similar purposes, the present invention offers further advantages in manufacture and operation.

Accordingly, an object of this invention is the provision of an electromechanical transducer providing optimum performance and which avoids limitations of previous transducers.

Another object of this invention is the provision of a long range electrical transducer capable of operating with great precision over an extended range generally of the order of several yards or more.

Another object of this invention is the provision of a precision transducer operating on a capacitive principle where only two reference potentials, one at each side of an electrical dividing line, are involved, thus avoiding problems in precise calibration and maintenance of the potential level of a large number of different reference potentials while also providing a transducer capable of being manufactured in a simple manner and for ready application to extended measuring ranges.

Another object of this invention is the provision of a precision transducer as referred to above wherein through the selective shifting of said electrical dividing line between electrical members having common potentials at each side thereof, said dividing line can be located within the extent of said pickoff element throughout its relative range of movement thus eliminating limitations associated with crossing members or segments of differing potentials such as crossing errors and discontinuity of electrical signals.

Another object of this invention is the provision in a precision long range transducer of a plurality of electrical members arranged side by side physically coupled together with electrical insulation therebetween, and electrically coupled together into a pair of electrical units of relatively different potentials with the electrical dividing line between such pair being selectively shifted to any desired coupling point between said members, whereby a pickoff capacitor element relatively moving along said electrical members forms a differential capacitor therewith thus providing a signal of such relative position as a function of the location of said dividing line and the signal from said capacitive electrode.

Another object of this invention is the provision of a precision long range electromechanical transducer of the character described adapted for using full system voltage across such pair of electrical units thus providing the optimum in signal to noise ratio.

Figure 2:
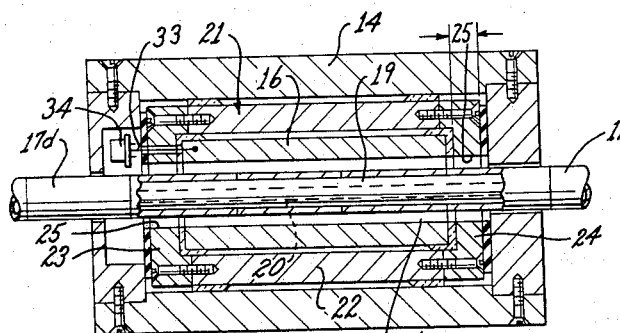
Figure 3:
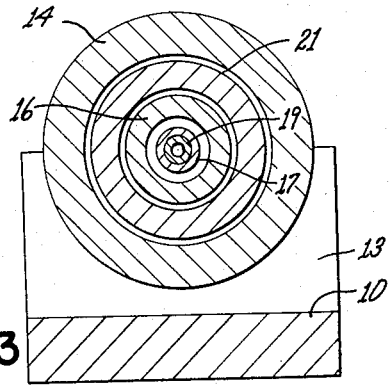
Figure 3:
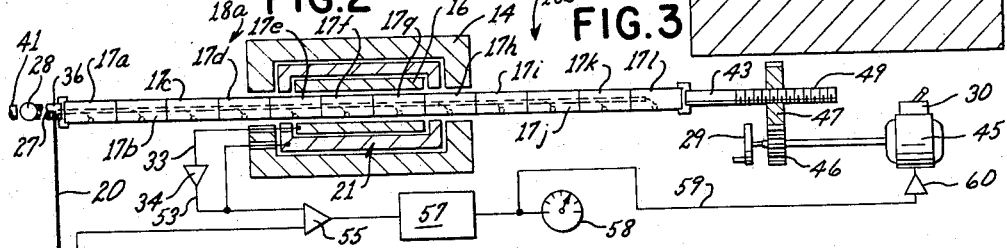
Figure 4:
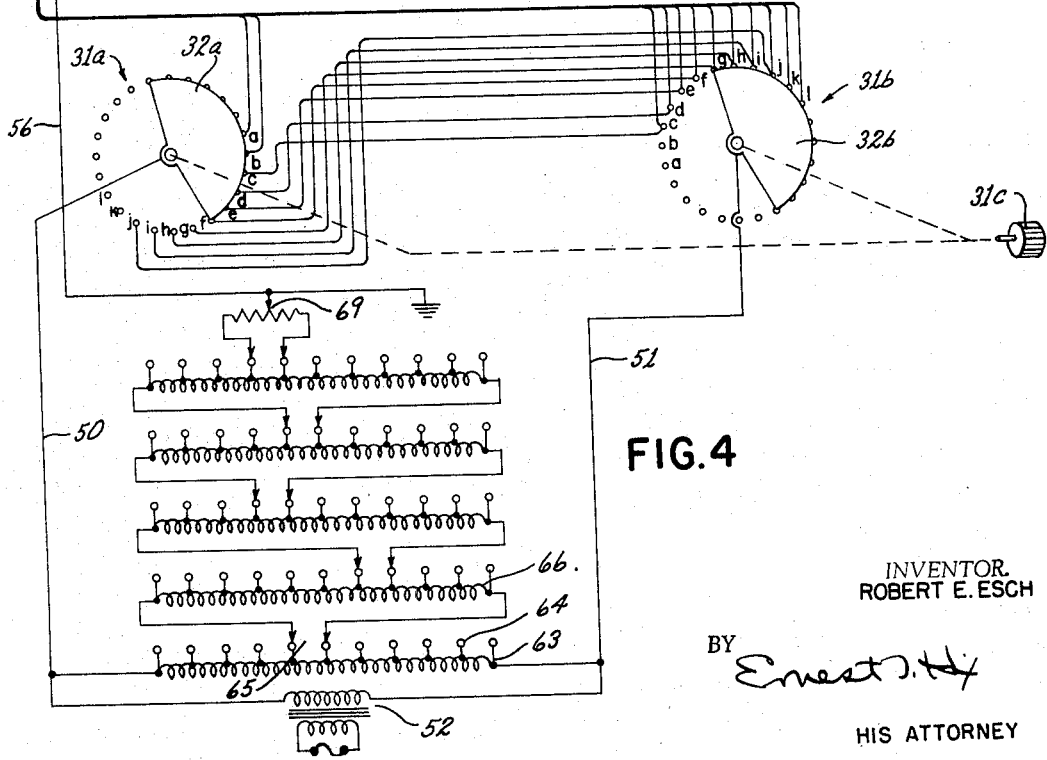
Figure 5:
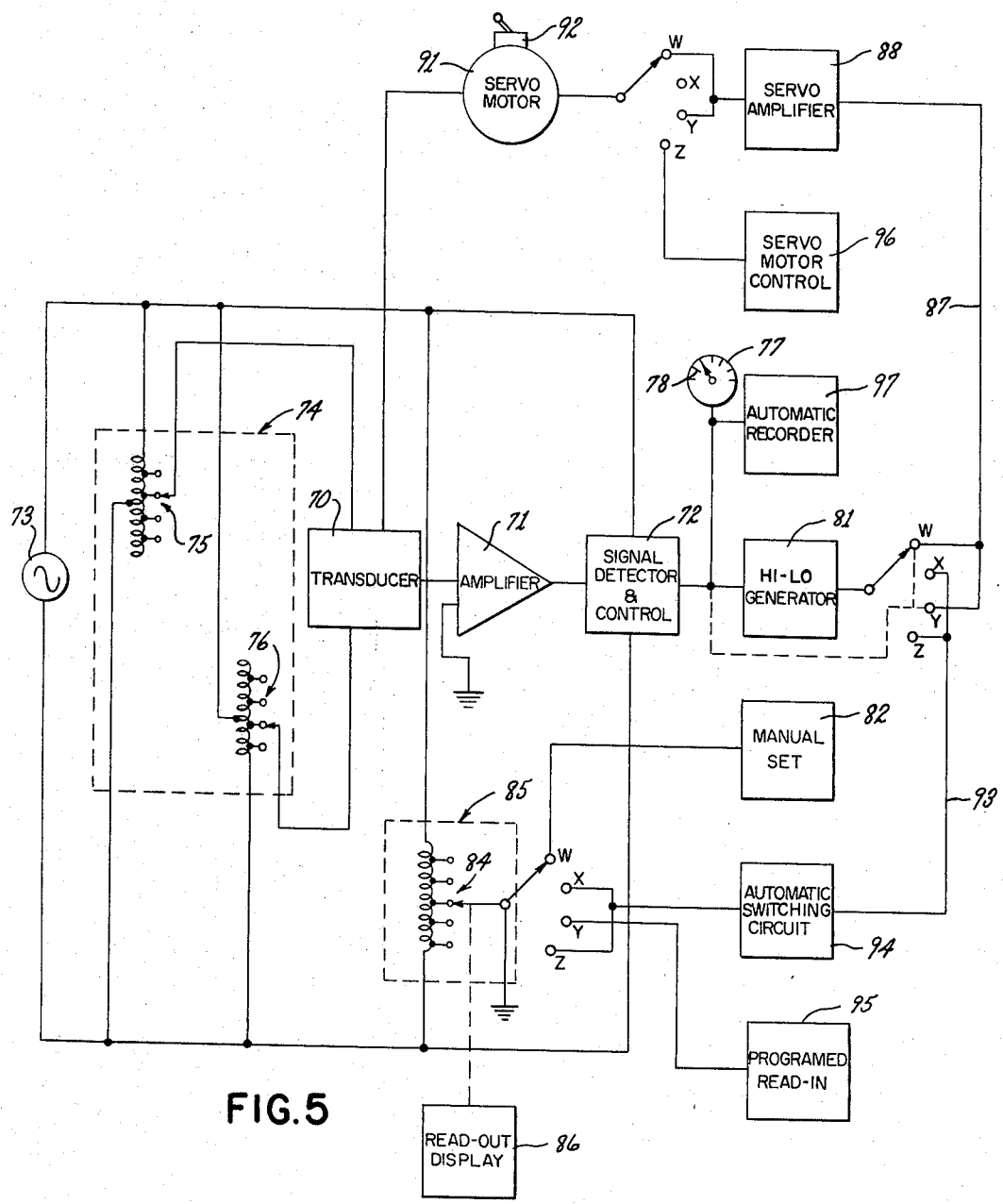

Other objects and advantages of this invention will be apparent from the following description, the appended claims, and the accompanying drawings in which, FIG. 1 is a side elevation of an electromechanical transducer of one exemplary embodiment of the present invention, FIG. 2 shows a fragmentary central section on the line 2—2 of FIG. 1, FIG. 3 is a section on line 3—3 of FIG. 1, FIG. 4 shows a system in which the transducer of FIG. 1 is connected to the electrical elements of the system, and FIG. 5 shows a schematic electrical diagram of another exemplary embodiment of the invention applied to systems having automatic and manual modes of operation.

The present invention has application not only in determining the relative positions of the relatively movable members, for use, for example, in determining the dimension of a part contacted by a work engaging probe; but would also have application in the precise positioning of movable components to predetermined locations.

Referring more particularly to the drawings, in which a preferred exemplary embodiment of the invention has been illustrated, FIGS. 1-3 show a differential capacitor arranged on a suitable support 10 having carrying brackets 11 and 12 and cradle supports 13 which carry a covering or shield cylinder case 14. A pickoff capacitive element 16 is carried within case 14 and is concentrically arranged therewith. Radially spaced from pickoff element 16 a plurality, and in this example more than two, elongated capacitive cylindrical members or tubular bars 17a–17l are carried for relative movement within case 14. Members 17a–l are similar in construction and insulated from (and mechanically connected to) each other by suitable electrical insulating means such as a thin glass coating applied to one end of such members and arranged to separate adjoining members.

In the illustrated embodiment members 17a–17l are annular members of equal length and pickoff conductor 16 is an annular ring longer than the effective length of any given member. In this application the length of ring 16 is two and one-half times the length of a given member.

Means fastening tubular members 17a–l to form a single structure includes a straight rigid tube 19 which provides structural integrity to members 17 and suitable means for fixing the inner surfaces of members 17 to the outside surface of tube 19 thereby fastening such members together in a rigid manner.

Electrical connecting means including electrical leads are provided to each of said capacitive members 17a–l which leads are conveyed through the center of tube 19 by an electrical harness 20. First source means providing a first electrical potential includes lead 50 from transformer 52 and second source means includes a line 51 from transformer 52 for providing a second electrical potential differing from that provided by said first source means are employed through switching means, to be described later, for connecting selected ones of said members through said leads into an operative pair, indicated generally at 18a and 18b, of electrical units having said first and second electrical potentials at respective sides of an electrical dividing line between such units. It will be apparent that with this arrangement the same electrical potential will be provided across the selected members at the respective sides of such dividing line. In the switch position illustrated in FIG. 4 operative pair 18a and 18b of such electrical units is comprised respectively of members 17a–f and 17g–l.

With alternating current supplied to electrical units 18a and 18b the capacitive coupling that exists between such units and pickoff element or ring 16 is such that a position (voltage) signal is obtained from the pickoff ring depending upon the relative axial position of the ring with respect to such units. Throughout the range of relative movement between the single structure and ring 16 an end of the ring 16 will not reach or pass over the gap or connection that exists between the two electrical units and errors in signals that could be obtained through capacitive fringing effects are avoided by assuring that the dividing line is always within the extent of the pickoff element or ring 6. This is achieved either by determining the position and manually switching the dividing line, or by automatic switching as will be subsequently described.

It will be apparent, therefore, that with this novel and unique arrangement there is always only one pair of electrical units, 18a and 18b in this illustration, in operative association with the pickoff element 16 and that those members comprising a given unit are electrically connected in series across the same electrical potential.

Pickoff ring 16 is suitably fastened to a shield 21, for example, by using cement which also electrically insulates the ring 16 from such shield. Shield 21 is similarly fastened to case 14 to provide support and electrical insulation. In the illustrated embodiment the shield 21 is comprised of a right circular cylindrical element 22 to which are attached segments 23 and 24 at each end to effectively extend the shielding effect to either side along the length of ring 16.

Electrical signal means responsive to the position of pickoff element 16 relative to the previously mentioned single structure (comprised of members 17a–l fixed to tube 19) and its relative extent to each side of the electrical dividing line between units 18a and 18b includes electrical connection 33 fastened to pickoff element 16 and extending to an amplifier 34 which, as indicated in FIG. 2, is preferably carried within the differential capacitor. The shield or case 14 in the illustrated embodiment is supported on cradle supports 13; and case 14 supports shield assembly 21 which in turn supports pickoff ring 16 adjacent electrical units 18a and 18b with its axis generally coincident therewith and radially spaced therefrom to provide an annular air gap between such units and cylindrical ring 16 while effectively shielding pickoff element 16 from extraneous effects.

Shield 21 reduces capacitive fringing effects because, as will be apparent from FIG. 4, the signal from cylinder 16 is fed to unity gain amplifier 34 the output of which is returned to shield 21, which shield will then follow the potential of ring 16. The effect of this physical and electrical arrangement is to extend shield 21 beyond ring 16 a distance indicated at 25 which is preferably several times the air gap illustrated at 26 causing the electric lines of force between ring 16 and units 18a and 18b to approach perpendicularity thus reducing capacitive fringing, and minimizing capacitive losses between ring 16 and shield 21.

The rigid tube 19, as shown, has an end portion 36 extending beyond members 17 and an opening 27 in tube 19 normal to the axis of such tube through which the electrical leads from members 17a–l extend and are electrically connected to an electrical balancing circuit to be subsequently described.

The tube 19 is fixed to an operated bar which extends slidably through an opening in the carrying bracket 11 and has a partly spherical work engaging tip 28 which operates against any suitable member such as 41, the position of which is to be indicated. At its opposite end rigid tube 19 is fixed to an operating bar 43 slidably supported in carrying bracket 12. The outwardly projecting end of the operating bar 43 is capable of adjustment manually by a handwheel 29 or under the control of an electrical motor 45 through energization of switch 30. Depending upon whether operation is manual or motor driven, handwheel 29 or motor 45 respectively operates a gear 46 connected to rotate a nut 47 carried in a stationary nut support 48. The inside of the nut is provided with operating threads engaging threads 49 on the operating bar. The structure just described is merely exemplary of the manner in which relative movement can be obtained. By moving the operating bar in the direction of its axis rigid tube 19 carrying units 18a and 18b of the differential capacitor are moved relatively with respect to the pickoff ring 16 and because the effective length of such units may be of the order of several inches and up to several yards or more, the apparatus has a comparatively large range of adjustment. Since the air gap that exists between the pickoff capacitive element 16 and electrical units 18a and 18b is equally effective, errors are not introduced by change in the dielectric nature of the air due for example to varying temperature, pressure or humidity.

As previously mentioned the dividing line between the two adjacent electrical units is shifted to fall within the extent of pickoff element 16. In the embodiment of the invention as illustrated in FIG. 4 this is achieved through the use of switch means such as rotary switches 31a and 31b having conductive plate wipers 32a and 32b respectively which are coupled together for rotation through identical angular displacements as by a knob 31c. Note that letter designations a through l on the contact terminals of switches 31a and 31b correspond to the letter designations on members 17a–17l respectively. In the example illustrated in FIG. 4, leads from members 17a and b are permanently connected to switch 31a while leads from members 17k and l are permanently connected to switch 31b. Assume switch 31a and corresponding wiper 32a is rotated by turning knob 31c clockwise five increments, for example, switch 31b and its wiper 32b is also simultaneously rotated clockwise five increments, causing the electrical dividing line to be shifted so that members 17a–k are in one electrical unit and member 17l is in the other electrical unit. It will be apparent that any desired number of members may be selected for each given unit in the pair by rotating switches 31a and 31b through desired angular increments clockwise or counter-clockwise. Thus the dividing line is always selected to fall within the extent of pickoff element 16, and the end of element 16 does not cross the insulated gap that exists between units 18a and 18b such that the signal produced at the output of the field effect amplifier 34 is uniformly directly proportional to displacement of the bars or units 18a and 18b with respect to the pickoff cylinder.

In the embodiment of the invention particularly shown in FIG. 4, all units to either side of a given selected dividing line are electrically connected as a given unit. However, it may be desirable and indeed preferred in some applications, to select and electrically connect as few as one member on a given side of the electrical dividing line or any number of members to either side of such electrical dividing line as required by the particular application.

The two electrical units 18a and 18b are connected through wires 50 and 51 to the output of a transformer 52 which forms a source of supply alternating current, preferably of the order of 1,000 cycles per second and at 125 volts, for example. The signal produced by amplifier 34 is conducted through a lead 53 to an amplifying and combining device 55 which is also supplied with a signal through a lead 56 as will be presently described. The combined and amplified signal produced by the amplifying device 55 is conducted to a phase sensitive detector 57 which is connected to an indicator 58 and connected through lead 59 to amplifier 60. The amplified signal from the amplifier 60 extends to the operating motor 45 to control the speed and direction of that motor so that the motor will automatically function as the moving means of the differential capacitor.

Connected across the supply lines 50 and 51 is an adjustable precision voltage divider including an auto transformer 63 suitably tapped as indicated at 64 so that adjacent taps may be connected through switching means 65 controlled by the operator. These switching means are connected to a second auto transformer 66 which also has tap terminals. In the same way a series of these tapped auto transformers are connected one to the other as indicated so that the signal produced at the output 69 may be very precisely controlled through the adjustable precision voltage divider with an extremely high degree of accuracy. There is suitable provision for showing the operator the size of the adjustment to be made so that as a movement for example of .78 inch is to be obtained with respect to the pickoff conductor the operator will shift the dividing line to the appropriate point and set the precise voltage divider to the correct amount thus producing a precisely determined amount of signal in the output line 56 which leads to the amplifier 55 and when this signal is exactly counteracted by the signal produced by the pickoff conductor 16 as amplified by amplifier 55 the indicator 58 will show the signal is nulled. However, until the signal is nulled the signal produced from the phase sensitive detector 57 and amplified by amplifier 60 will, under motor operation, cause the motor 45 to operate in the proper direction so as to move the units 18a and 18b in the proper direction to null the signal. In this way the operated bar 41 controlled by the differential capacitor will be adjusted through an exact distance. Or the differential capacitor may itself be manually adjusted by handwheel 29 to a desired extent. The amount of adjustment may be determined by reference to the position of knob 31c as necessary to shift the electrical dividing line within the extent of pickoff element 16 (as indicated by the response of indicator 58), and the amount of adjustment of the voltage divider as necessary to then obtain a nulled condition and a zero reading on indicator 58.

In any event, it should be appreciated that precisely determining the relative position of said pickoff element 16 and said single structure through reference to the joint condition of said shifting is equally applicable where the determination referred to involves setting the position of element 16 with respect to the single structure in advance and then determining the corresponding electrical equivalent and conversely the situation where the electrical equivalent is established in advance and element 16 is relatively moved to determine a corresponding position where the electrical signal will be nulled.

In the embodiment of the invention illustrated in FIG. 5, a differential capacitor or transducer 70 of the character described in the embodiment of FIGS. 1–4 is employed. A signal is obtained from transducer 70 as previously explained which is determined by the position of pickoff element 16 to the left of, to the right of, or its extent to each side of the electrical dividing line. Said position signal is such that the electrical dividing line will be shifted to form electrical units 18a and 18b on respective sides thereof such that said line will fall within the extent of pickoff element 16 during automatic operation and is manually shifted to fall within such extent during manual operation. The position signal is amplified in an amplifier 71 and fed to a signal detector and control unit 72 which also receives a signal from a reference AC source 73. Means for adjusting the electrical potential across the selected members at the respective sides of said dividing line separating electrical units 18a and 18b includes a zero and span ratio transformer 74 provided as shown in the circuit and including a pair of adjustable arms 75 and 76 whereby through adjustment of such arms the voltage to each electrical unit of said pair of arms is corrected to enable the modification of the output position signal from such transducer. It will be apparent that with this arrangement if it is desired to provide an electrical signal which corresponds in some unusual ratio to a unique measurement unit desired to be employed, this is simply achieved by selective adjustment of arms 75 and 76. Furthermore with this arrangement the centering point, as well as the effective span of pickoff element 16 may be artificially changed making possible great operating flexibility.

In a known manner unit 72 detects the deviation in magnitude and direction of the position signal with respect to a desired signal corresponding to a desired position, generally referred to as the null position. Such null position can be displayed in the form of an analog signal on null indicating means such as an indicating device or indicator 77. Indicator 77 may also be provided with suitable graduations illustrated at 78 indicating in analog form the magnitude of deviation from null. Such graduations may in some applications be directly marked to read in suitable linear units, while in other applications it may be desirable or preferable to utilize the analog output signal from unit 72. The deviation signal is provided to a "hi-lo" generator unit 81 which converts such analog deviation signal into a digitized output signal which may be used in a number of modes of operation. Four modes of operation will now be described and for use of presentation will be referred to as the W, X, Y, and Z moves or positions. To operate the system in a desired mode, the circuit is first completed for that mode, for example, by switching the arrows shown in the drawing to the proper position.

In the W mode or position, a desired displacement of the relatively movable members of the differential capacitor or transducer is manually set into the system through control 82 in the form of a known electrical signal while simultaneously adjusting the position of the dividing line within the extent of pickoff element 16. The net effect of this is to move an adjustable arm 84 of a ratio transformer 85 to a position corresponding to such known electrical signal. The electrical value, or a dimensional equivalent, may be displayed on a readout console unit 86 to assure that arm 84 has been adjusted to the proper position. The manually set electrical signal is combined and compared in unit 72 with the signal from transducer 70. Such signal is then fed to unit 81 converted to a digitized output and supplied through a line 87 to a servo amplifier 88. Servo amplifier 88 energizes a servo motor 91 to automatically displace the relatively movable components of transducer 70 until an electrical signal is provided to null out the corresponding signal previously set on transformer 85. If desired, transducer 70 may be manually adjusted until a null is reached after energizing servo motor over-ride switch 92.

To operate the system in the X mode or position, the movable components of differential capacitor 70 are relatively displaced as desired, including for example providing a varying displacement controlled by a cam surface, and simultaneously the electrical dividing line is shifted within the extent of pickoff element 16 to provide a position signal. Such position signal is fed through amplifier 71 to unit 72 where it is compared with the signal from transformer 85 and an analog deviation signal is provided to unit 81 where it is converted to a digitized signal. The digitized signal from unit 81 is then supplied through line 93 to energize an automatic switching circuit shown at 94. The effect of switching circuit 94 is to automatically position adjustable arm 84 of ratio transformer 85 until the signal from transformer 85 to unit 72 balances the signal obtained due to the displacement of the movable components of transducer 70. The final position of arm 84 may be indicated on console 86.

In the Y mode of operation a programmed signal, such as a desired relative displacement of the movable members of the transducer is fed into the circuit as shown schematically at 95 as by punched tape, punched card, magnetic tape or the like. This arrangement provides for the automatic setting of arm 84 of ratio transformer 85 to a desired position as previously programmed while also setting the dividing line within the extent of pickoff element 16. Here also, equivalent dimensional displacement of such programmed signal may automatically be read out on console 86. The programmed signal is combined and compared in unit 72 with the signal from transducer 70 and supplied to unit 81 where in the manner previously described for the W mode of operation the relatively movable members of transducer 70 are displaced by servo motor 91 until such programmed signal is nulled.

In the Z mode of operation the system operates in a manner identical to the X mode of operation with the exception that a servo motor control device 96 (which may be provided with a signal in the form of a programmed input) is used to control servo motor 91 until the relatively movable members of transducer 70 are displaced as desired, while simultaneously shifting the electrical dividing line. The position signal thus obtained from element 16 is balanced in unit 85 and read out on unit 86 as previously described.

In any of these modes of operation the signal from signal detector and control unit 72 may be automatically recorded for permanent record, for example, on a recorder 97. Furthermore, in the W and Y modes of operation the servo motor 91 may be disabled by actuating switch 92 and the position of transducer 70 relative to the position previously set on unit 82 or 95 will be indicated on indicator 77. The electrical components illustrated in FIG. 5 operate very fast such that once a position signal from transducer 70 or an input from ratio transformer 85 has been introduced into the system a corresponding final output signal is obtained practically instantaneously.

Thus it will be seen that the present invention provides an electromechanical transducer giving optimum performance over ranges from a few inches to several yards or more and for both automatic or manual operation. Through use of an operative pair of multiple member electrical units at either side of a single electrical dividing line with the operative members to either side of said electrical dividing line at the same electrical potential circuitry is simplified and calibration problems are minimized. Through automatic or manual shifting of said single electrical dividing line it can be maintained within the extent of the pickoff element thus providing position accuracies within the order of a few millionths of an inch while nullifying capacitive fringing effects and avoiding gap crossing errors and discontinuity of electrical signals.

What is claimed is:

1. A position responsive measuring device comprising,
   a transducer having
       a plurality of electrical capacitive members arranged end-to-end and electrically insulated from each other,
       switch means electrically connecting selected ones of said members into an operative pair of electrical units defined by a shiftable electrical dividing line responsive to said switch means,
       means providing an electrical potential across the selected members at the respective sides of said dividing line and said electrical potential differing between each of said units, and
       a pickoff capacitive member providing a position signal determined by the position of said pickoff member relative to said dividing line,
   means supporting said electrical capacitive members and said pickoff capacitive members for relative movement,
   an amplifier connected to said transducer to amplify said position signal,
   means providing a reference signal,
   a combining device connected to said amplifier and said reference signal means providing a combined signal in response to the magnitude and direction of said position signal with respect to said reference signal,
   a phase sensitive detector connected to said combining device to receive said combined signal and provide a signal in response thereto, first mode control means including means to preset said switch means and said reference signal means for a predetermined relative position, and drive means connected to said relatively movable transducer members to adjust said movable members in response to said combined signal from said combining means until said position signal balances said preset reference signal, second mode control means including means to preset said relatively movable transducer members to a desired physical displacement wherein a given position signal is provided, means for automatically adjusting said switch means and said reference signal means until said reference signal balances said position signal, manual selector means for rendering one of said first and second mode control means operative, means for adjusting said electrical potential across the selected members at the respective sides of said dividing line including a zero and span ratio transformer having a pair of adjustable arms whereby through adjustment of such arms the voltage to each electrical unit of said pair is corrected to enable the modification of the output position signal from such transducer, and indicating means connected to and responsive to said phase sensitive detector providing an indication of the magnitude of said combined signal.

References Cited
UNITED STATES PATENTS

| | | | |
|---|---|---|---|
| 1,959,804 | 5/1934 | Wittkuhns et al. | 318—31 |
| 1,970,442 | 8/1934 | Wittkuhns et al. | 318—31 |
| 3,071,758 | 1/1963 | Wolfendale | 340—200 X |
| 3,242,472 | 3/1966 | Anthony | 340—200 X |
| 3,244,956 | 4/1966 | Mierendorf. | |
| 3,296,522 | 1/1967 | Wolfendale | 323—93 |
| 3,297,941 | 1/1967 | Wolfendale | 323—93 |

RUDOLPH V. ROLINEC, *Primary Examiner.*

WALTER L. CARLSON, *Examiner.*

E. F. KARLSEN, *Assistant Examiner.*